US011288439B2

(12) United States Patent
Li

(10) Patent No.: US 11,288,439 B2
(45) Date of Patent: Mar. 29, 2022

(54) METHOD, EQUIPMENT, AND MEDIUM FOR DISPLAYING CONTENT

(71) Applicant: Beijing Dajia Internet Information Technology Co., Ltd., Beijing (CN)

(72) Inventor: Fang Li, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 17/010,673

(22) Filed: Sep. 2, 2020

(65) Prior Publication Data
US 2020/0401758 A1    Dec. 24, 2020

(30) Foreign Application Priority Data

Sep. 3, 2019   (CN) .......................... 201910826725.9

(51) Int. Cl.
*G06F 40/109* (2020.01)
*G06F 3/04842* (2022.01)
*G06F 3/04847* (2022.01)

(52) U.S. Cl.
CPC ........ *G06F 40/109* (2020.01); *G06F 3/04842* (2013.01); *G06F 3/04847* (2013.01)

(58) Field of Classification Search
CPC . G06F 40/109; G06F 3/04842; G06F 3/04847
USPC ....................................................... 715/269
See application file for complete search history.

(56) References Cited

U.S. PATENT DOCUMENTS

| 9,391,933 | B2* | 7/2016 | Langholz | ........... | H04N 5/23293 |
| 10,635,277 | B2* | 4/2020 | Kim | ................... | G06F 3/04845 |
| 2008/0024502 | A1* | 1/2008 | Nagahara | .............. | G06F 40/103 |
| | | | | | 345/472 |
| 2009/0110287 | A1* | 4/2009 | Bates | ...................... | G09G 5/00 |
| | | | | | 382/190 |

(Continued)

FOREIGN PATENT DOCUMENTS

| CN | 101158940 | 4/2008 |
| CN | 106126031 | 11/2016 |

(Continued)

OTHER PUBLICATIONS

Office Action received in priority application CN 201910826725.9 dated Jun. 1, 2020.

(Continued)

*Primary Examiner* — William D Titcomb
(74) *Attorney, Agent, or Firm* — Knobbe, Martens, Olson & Bear, LLP

(57) ABSTRACT

The present disclosure relates to a method, device and terminal for displaying content, and a medium, used for completely displaying content entered by a user when a content including many characters is entered in an input box, so as to avoid tedious operation when the user views the entered content which is not displayed. The method for displaying content of the present disclosure includes: receiving target content entered in a first display region; calculating an occupancy rate based on the target content and the first display region in real time; reducing a font size of the target content in response to that the occupancy rate satisfies a first condition; generating a second display region for displaying the target content in response to that the occupancy rate satisfies a second condition.

8 Claims, 7 Drawing Sheets

(56) References Cited

U.S. PATENT DOCUMENTS

| | | | | |
|---|---|---|---|---|
| 2011/0035688 A1* | 2/2011 | Kinoshita | ................. | G06F 8/38 |
| | | | | 715/763 |
| 2014/0280693 A1* | 9/2014 | Schwanitz | .............. | H04L 67/04 |
| | | | | 709/217 |
| 2015/0312182 A1* | 10/2015 | Langholz | .............. | G06F 3/0488 |
| | | | | 715/753 |
| 2015/0347356 A1 | 12/2015 | Beaver et al. | | |
| 2017/0277415 A1* | 9/2017 | Kim | ...................... | G06F 16/345 |
| 2018/0232135 A1* | 8/2018 | Wang | ................... | G06F 3/04845 |
| 2018/0315248 A1* | 11/2018 | Bastov | .................. | G06T 19/006 |
| 2021/0216177 A1* | 7/2021 | Zhang | .................. | G06F 3/0482 |

FOREIGN PATENT DOCUMENTS

| | | |
|---|---|---|
| CN | 106255949 | 12/2016 |
| CN | 106557453 | 4/2017 |
| CN | 108304132 | 7/2018 |
| CN | 109640148 | 4/2019 |
| CN | 109948129 | 6/2019 |

OTHER PUBLICATIONS

Office Action received in priority application CN 201910826725.9 dated Jul. 23, 2020.

\* cited by examiner

METHOD, EQUIPMENT, AND MEDIUM FOR DISPLAYING CONTENT

CROSS-REFERENCE TO RELATED APPLICATION

This application is based on and claims priority under 35 U.S.C 119 to Chinese Patent Application No. 201910826725.9, filed on Sep. 3, 2019, in the China National Intellectual Property Administration. The entire disclosure of the above application is incorporated herein by reference.

FIELD

The present disclosure relates to the field of application software technology, in particular to a method, terminal, and a medium for displaying content.

BACKGROUND

In the related art, when content entered to electronic equipment (such as a mobile phone) exceeds the width of an input box in the electronic equipment, the exceeding content overflows, and a display focus moves backwards, that is, the displayed content is in a current entered position. When a content including many characters is entered in the input box, interaction is tedious and use is inconvenient.

SUMMARY

According to an embodiment of the present disclosure, provided is a method for displaying content, including:
  receiving target content entered in a first display region;
  calculating an occupancy rate based on the target content and the first display region in real time;
  reducing a font size of the target content in response to that the occupancy rate satisfies a first condition; and
  generating a second display region for displaying the target content in response to that the occupancy rate satisfies a second condition.

In a possible implementation, according to the method for displaying content provided by the present disclosure, the calculating the occupancy rate based on the target content and the first display region in real time comprises:
  calculating the occupancy rate in real time based on at least one of:
  a length of the target content and a length of the first display region;
  an area of the target content and an area of the first display region; and/or
  a character number of the target content and a preset character number of the first display region.

In a possible implementation, according to the method for displaying content provided by the present disclosure, the first condition is that the occupancy rate is greater than a preset threshold.

In a possible implementation, according to the method for displaying content provided by the present disclosure, the second condition is that the occupancy rate is greater than the preset threshold and the font size of the target content is the minimum font size.

In a possible implementation, according to the method for displaying content provided by the present disclosure, the method further includes: displaying the target content with the minimum font size in the second display region.

In a possible implementation, according to the method for displaying content provided by the present disclosure, the reducing the font size comprises: determining a reduced font size; and reducing the font size to the reduced font size in a fixed interval.

In a possible implementation, according to the method for displaying content provided by the present disclosure, the method further includes: displaying the target content with the reduced font size in the first display region, in response to that the reduce font size is not the minimum font size.

According to an embodiment of the present disclosure, provided is a terminal for displaying content, including:
  a processor; and
  a memory configured to store one or more instructions executed by the processor;
  wherein the processor is configured to execute the instructions to perform the method for displaying content disclosed above.

According to an embodiment of the present disclosure, provided is a storage medium, configured to store one or more instructions which are executed by a processor of a terminal for displaying content to perform the method for displaying content disclosed in the embodiment of the present disclosure.

According to an embodiment of the present disclosure, provided is a computer program product, including:
  a processor; and
  a memory configured to store one or more instructions executed by the processor;
  wherein the processor is configured to execute the instructions to perform the method for displaying content disclosed above.

BRIEF DESCRIPTION OF THE DRAWINGS

Accompanying drawings here, which are incorporated in and constitute a part of this specification, illustrate embodiments consistent with the present disclosure and, together with the description, serve to explain principles of the present disclosure and do not constitute an inappropriate limitation on the present disclosure.

DETAILED DESCRIPTION OF THE EMBODIMENTS

In order to enable those of ordinary skill in the art to better understand technical solutions of the present application, the technical solutions in embodiments of the present application will be clearly and fully described in combination with the accompanying drawings.

It should be noted that terms "first", "second" and the like in the description, claims and above-mentioned accompanying drawings of the present disclosure are used for distinguishing similar objects and not for describing a specific order or sequence. It should be understood that data used in such a way are interchangeable under appropriate circumstances, so that the embodiments of the present disclosure described herein can be implemented in the order other than those illustrated or described herein. The embodiments described in the following exemplary embodiments do not represent all embodiments consistent with the present disclosure. Contrarily, they are merely examples of devices and methods consistent with some aspects of the present disclosure described in details in the appended claims.

Currently, in some electronic equipment, when content is entered by the user to display, such as a payment amount entered during an electronic payment process and communication content entered during an instant messaging process, by a user is displayed according to different application scenes. The length of the content entered may be limited by an input range in an interface in actual scenes.

Figure 1:
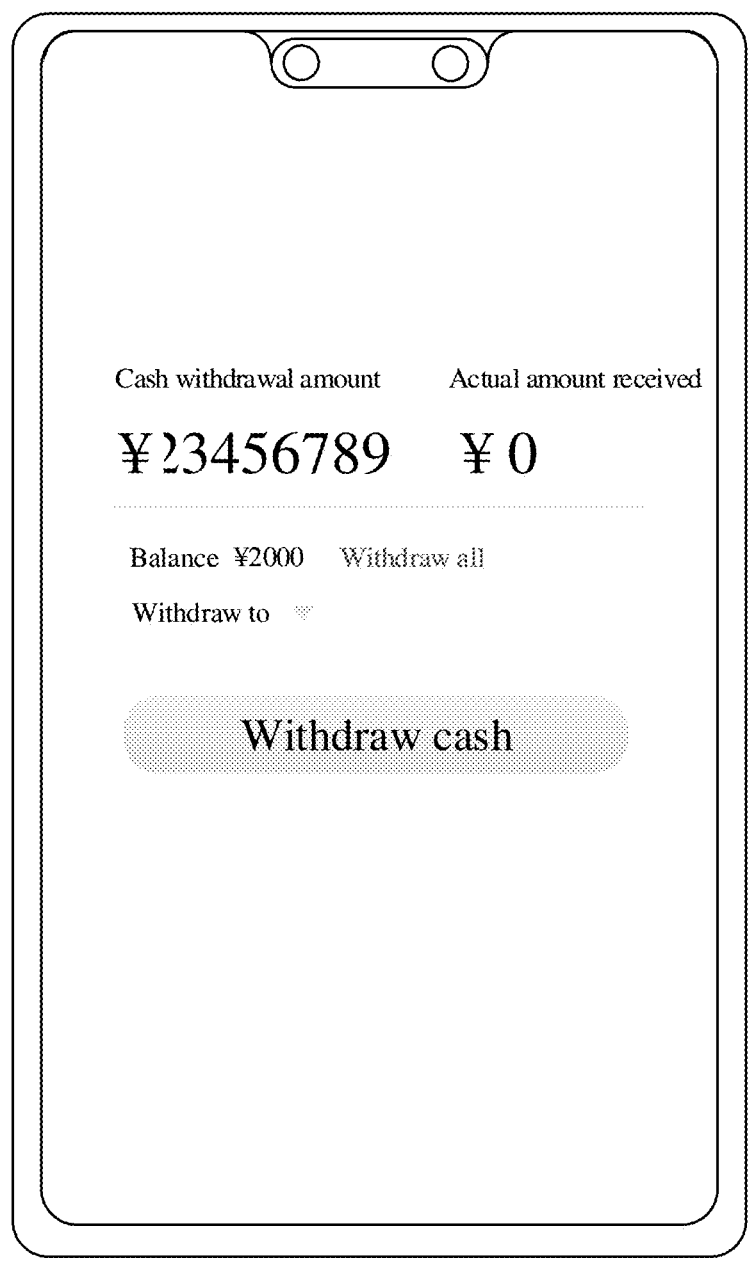
FIG. 1 is an effect drawing of a method for displaying content in the related art.

As shown in FIG. 1, in an input box for entering cash withdrawal amount in an interface of electronic cash withdrawal, at most seven characters in a default font size can be entered. When the length of the content entered by the user exceeds the length of the input box, in the related art, the content exceeding the input box overflows out of the input box, meanwhile, a display focus moves backwards, and the entered content with the same length as the input box before the display focus can be displayed.

If "123456789" is entered in the interface of electronic cash withdrawal as shown in FIG. 1, the user continues entering the eighth and ninth characters in the default font size after the seventh character in the default font size is entered. At the moment, the display focus is at the ninth character, and the content of the ninth character and the six characters, namely "3456789", before the ninth character can be completely displayed, but the two exceeding characters '12' may overflow out of the input box, that is, the first character "1" is not displayed at all, and the second character "2" is only partially displayed without being completely displayed.

In the scene above, if the content of the part that is not displayed in the input box needs to be modified, the display focus (for example, a cursor for indicating an input position) needs to be moved to the position where the content needs to be modified, so that the modified content can be displayed in the input range, and therefore, when the entered content is modified, operation for modifying is tedious due to the fact that all the entered content cannot be completely displayed.

In conclusion, in the related art, when the content entered by the user exceeds the input box, the entered content cannot be completely displayed, so that when the user views the entered content or modifies the content exceeding the input box, an interactive operation process is tedious and use is inconvenient.

Therefore, an embodiment of the present disclosure provides a scheme for displaying content, which is used for completely displaying all the entered content when much content is entered in the input box and simplifying the interactive operation process of viewing and modifying the entered content, and is convenient to use.

Figure 2:
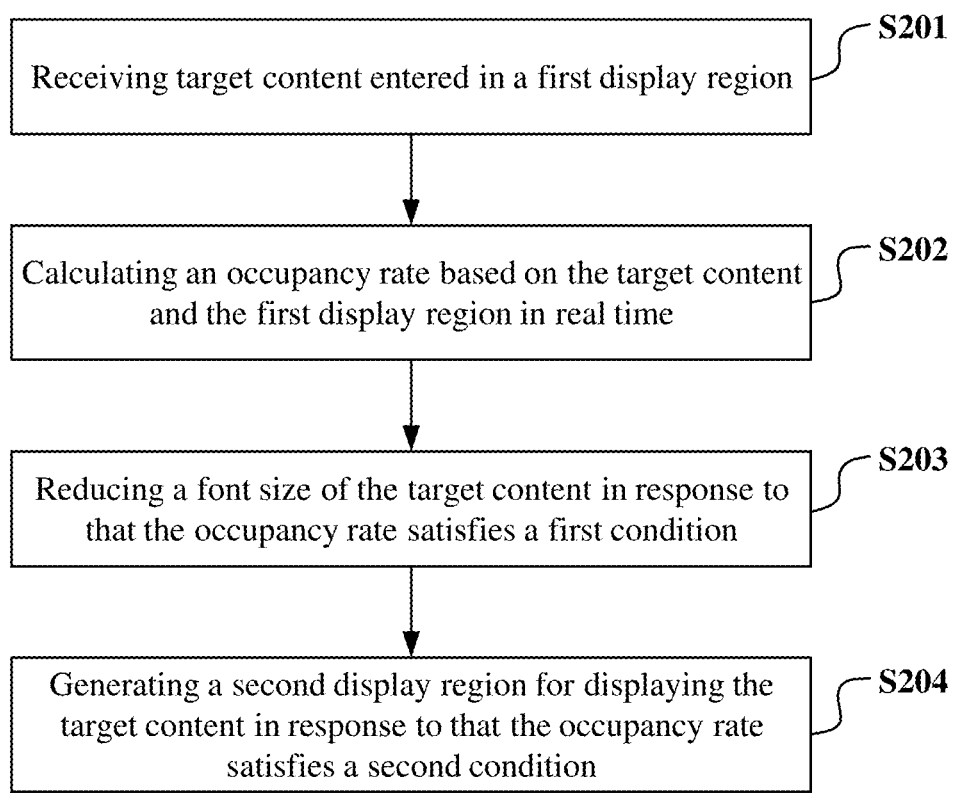
FIG. 2 is a schematic diagram of a method for displaying content according to an embodiment of the disclosure.

FIG. 2 is a schematic diagram of a method for displaying content as shown in an embodiment of the disclosure. As shown in FIG. 2, the method for displaying content includes the following steps S201 to S204.

Step S201, receiving target content entered in a first display region.

In some embodiments, the target content entered by the user is received, wherein the target content may be all the content (such as words, letters, numbers, symbols and expressions) entered by the user once or multiple times, and the content displayed in the first display region is the entered target content.

The first display region may be an input box, a suspension box or a movable input box. The first display region is used for displaying all the entered content. The first display region may be configured to be fixed in length and height according to actual application scene requirements. The shape, length and height of the first display region are not limited in the embodiment of the present disclosure.

It should be noted that when the target content is displayed in the first display region, the font size of the target content may be changed. Specifically, the font size of the target content may be changed within a certain range, for example, a maximum font size and a minimum font size are preset, and the font size of the target content displayed may be any font size between the maximum font size and the minimum font size.

When the content displayed in the first display region is not empty or the target content entered by the user is not received for the first time, the font size of the target content displayed in the first display region is the current font size. When the target content entered by the user is not received, the content displayed in the first display region is empty (or may also be preset displayed content, for example, "please enter search content" and the like is displayed in the first display region). When the target content entered by the user is received for the first time, the step S202 below may be executed after the target content is displayed in the first display region in the preset default font size, or the target content may be displayed in the first display region after the step S203 below is executed according to the fact that the font size of the entered target content is the preset default font size.

Step S202, calculating an occupancy rate based on the target content and the first display region in real time. Wherein the term "in real time" means that the ratio is recalculated once the target content changes, such as the front size of the target content changes.

In some embodiments, the occupancy rate is calculated based on at least one of: a length of the target content and a length of the first display region; an area of the target content and an area of the first display region; and/or a character number of the target content and a preset character number of the first display region.

Step S203, reducing a font size of the target content in response to that the occupancy rate satisfies a first condition, wherein the first condition is that the occupancy rate is greater than a preset threshold. The method may further include: displaying the target content with the reduced font size in the first display region, in response to that the reduce font size is not the minimum font size.

In some embodiments, the font size of the target content is reduced to the reduced front size in a fixed interval, wherein the fixed interval is the font size interval. Before The front size of the target content is reduced, the front size which should be reduced of the target contend may be determined.

In some embodiments, in the condition that the font size of the target content is reduced, the occupancy rate based on the target content and the first display region is recalculated.

In some embodiments, whether the occupancy rate meets the first condition is determined. When it is determined that the occupancy rate meets the first condition, the font size of the content displayed in the first display region is reduced, and the target content is completely displayed in the first display region, so that the target content is completely displayed in the first display region, interactive operation when the target content is viewed and modified is simplified, and use is convenient. Wherein the first condition is that the occupancy rate is greater than a preset threshold. For example, in response to that the occupancy rate is greater than a preset threshold, the font size of the target content is reduced. In the condition that the font size of the target content is reduced, the occupancy rate based on the target content with the reduced front size and the first display region is recalculated.

It should be noted that after the font size of the content displayed in the first display region is reduced, whether the occupancy rate recalculated still meets the first condition may be determined again, that is, the operation of determining whether the occupancy rate meets the first condition may be a cyclically executable process, and whether the occupancy rate meets the first condition may be determined again after the font size is reduced, or a determining interval may also be set, and whether the occupancy rate meets the first condition is periodically determined according to the fixed interval (for example, 0.5 second), which aims at ensuring that the target content entered by the user is completely displayed in the first display region in real time, display overflow is avoided, and all the content can be viewed conveniently.

In some embodiments, the occupancy rate which is calculated in real time may include at least one of:

the ratio of the length of the target content to the length of the first display region;

the proportion of the area of the target content to the area of the first display region; or the ratio of the number of the characters of the target content to the preset character number of the first display region.

In some embodiments, the preset threshold may be set according to actual conditions. For example, the preset threshold is 0.9. The preset character number of the first display region may also be set according to actual situations, for example, for the input box as shown in FIG. 1, the preset character number may be 7.

In some embodiments, during the operation of determining whether the occupancy rate meets the first condition, when the target content entered by the user is received for the first time, whether the first condition is met is determined under the condition that the target content is in the preset default font size, and when the target content entered by the user is not received for the first time, whether the first condition is met is determined under the condition that the target content is the current font size.

The first display region is configured to display in a single row. The length of the first display region can be obtained according to the pre-configured length and height of the first display region. The font size of the displayed content of the first display region can be changed. The length of a single object (such as the word, letter, number, symbol and expression) displayed in the certain font size can be determined according to the width of each pre-configured font size. The length of the target content, namely the sum of the lengths of all the objects in the target content, is determined according to the length of the single object in combination with the number of the objects included in the target content.

Step S204: generating a second display region for displaying the target content in response to that the occupancy rate satisfies a second condition. Wherein the second condition is that the occupancy rate is greater than the preset threshold and the font size of the target content is the minimum font size. The method further includes: after the step S204, the target content with the minimum font size is displayed in the second display region.

If the ratio of the length of the target content to the length of the first display region is greater than the preset threshold and the font size of the target content is the minimum font size, it is determined that the target content cannot be completely displayed in the first display region; and if the ratio of the length of the target content to the length of the first display region is not greater than the preset threshold, it is determined that the target content can be completely displayed in the first display region, wherein the preset threshold (e.g., 0.85) may be an empirical value and can also be determined according to a test result in the actual application scene.

The first display region is configured to display in multiple rows, the area of the first display region can be determined according to the pre-configured length and height of the first display region, the area of the single object displayed in any font size can be determined according to the width and the height of each pre-configured font size. The area of the target content, namely the sum of the areas of all the objects in the target content, is determined according to the area of the single object in combination with the number of the objects included in the target content.

The proportion of the target content in the first display region is a ratio of the area of the target content to the area of the first display region. If the proportion of the target content in the first display region is greater than preset threshold, it is determined that the target content cannot be completely displayed in the first display region; and if the proportion of the target content in the first display region is not greater than the preset threshold, it is determined that the target content can be completely displayed in the first display region, wherein the preset threshold (e.g., 0.9) may be an empirical value and can also be determined according to the test result in the actual application scene.

If the ratio of the character number of the target content to a preset character number of the first display region is greater than the preset threshold and the font size of the target content is the minimum font size, it is determined that the target content cannot be completely displayed in the first display region; and if the ratio of of the character number of the target content to a preset character number of the first display region is not greater than the preset threshold, it is determined that the target content can be completely displayed in the first display region, wherein the preset threshold (e.g., 0.85) may be an empirical value and can also be determined according to a test result in the actual application scene.

In the three modes, the determination is carried out by taking the ratio or proportion as reference, and in practical application, the determination may also be carried out by taking the number of the characters as reference. Specifically, if the number of the characters (e.g., the total number of characters, letters, numbers, symbols and expressions) included in the target content is greater than the preset character number, it can be determined that the target content cannot be completely displayed in the first display region, and if the number of the characters included in the target content is not greater than the preset character number, it is determined that the target content can be completely displayed in the first display region.

Wherein the preset character number, namely the number of the characters that can be completely displayed in the first display region in the font size commonly used by the user, may be the ratio of the length of the first display region in the actual application scene to the width of the font size commonly used by the user and obtained according to test statistics. The preset character number, namely the number of the characters when the target content is completely displayed in the first display region in the preset default font size, may also be the ratio of the width of the first display region to the width of the preset default font size. Or the preset character number may also be the ratio of the width of the first display region to the width of the default font size set by the user himself/herself, that is, the number of the characters when the target content is completely displayed in the first display region in the default font size set by the user himself/herself.

It should be noted that the first condition may be any one or more of the above conditions. Other conditions may also be set according to the actual application scenes. If the first condition is more than one of the above conditions and any one of the multiple conditions is met, it can be deemed that the occupancy rate meets the first condition.

In practical application, when the font size of the content displayed in the first display region is reduced, the font size of the content displayed in the first display region may be reduced by a preset interval for font size. For example, the preset font size range is from No. 10 to No. 1, the preset interval for font size is 1, and when the current font size of the content displayed in the first display region is assumed to be No. 6, after the font size of the content displayed in the display region is reduced, the font size is No. 5.

When the font size of the content displayed in the display region is reduced, the font size of the content displayed in the first display region may also be gradually reduced by a preset pixel value. For example, assuming that the pixel value of the current font size of the content displayed in the first display region is 10, and the preset pixel value is 2, the pixel value of the font size is 8 after the font size of the content displayed in the display region is reduced.

When the font size of the content displayed in the display region is reduced, the font size of the content displayed in the first display region may also be gradually reduced by a preset ratio. For example, assuming that the current font size of the content displayed in the first display region is 5 mm wide and 8 mm long, and the preset ratio is 0.8, the font size is 4 mm wide and 6.4 mm long after the font size of the content displayed in the display region is reduced.

In practical application, when the font size of the content displayed in the display region is reduced, the font size may also be directly reduced to the target font size, so that the target content can be completely displayed directly in the reduced font size in the first display region, wherein the target font size may be determined through the following two implementation modes.

The first implementation mode is as follows: the first display region is configured to display in a single row; the number of the characters included in the target content and the length of the first display region can be determined; the ratio of the length of the first display region to the number of the characters is calculated, wherein the ratio is the upper limit of the width of the font size when the target content is completely displayed in the first display region; and the width of the font size proximate to the ratio may be matched in the preset font sizes, and the matched font size is determined as the target font size.

The second implementation mode is as follows: the first display region is configured to display in multiple rows; the number of the characters included in the target content and the area of the first display region can be determined; the ratio of the area of the first display region to the number of the characters is calculated, wherein the ratio may be the upper limit of the product of the width and length of the font size when the target content is completely displayed in the first display region; and the product of the width and length of the font size proximate to the ratio may be matched in the preset font sizes, and the matched font size is determined as the target font size.

In a possible implementation, the target content is displayed in the current font size in the first display region when it is determined that the target content does not meet the first condition.

In some embodiments, when it is determined that the target content does not meet the, e.g., the occupancy rate is not greater than the preset threshold, that is, the target content entered by the user can be completely displayed in the first display region, display overflow does not occur, the target content is displayed in the current font size in the first display region.

In practical application, it is possible that the occupancy rate meets the first condition and the current font size is the preset minimum font size and cannot be reduced, in view of this, the method provided by the present disclosure may also include: establishing a second display region used for displaying content and displaying the target content in the second display region when it is determined that the occupancy rate meets the first condition and the font size of the content displayed in the first display region is the preset font size (e.g. the minimum font size), wherein the display area of the second display region is greater than that of the first display region.

In some embodiments, when the occupancy rate meets the first condition, it is indicated that the target content cannot be completely displayed in the first display region, and at the moment. If the font size of the content displayed in the first display region is a preset minimum font size, the target content cannot be completely displayed in the first display region by reducing the font size. Then the second display region is established, and the target content is displayed in the second display region.

Figure 3:
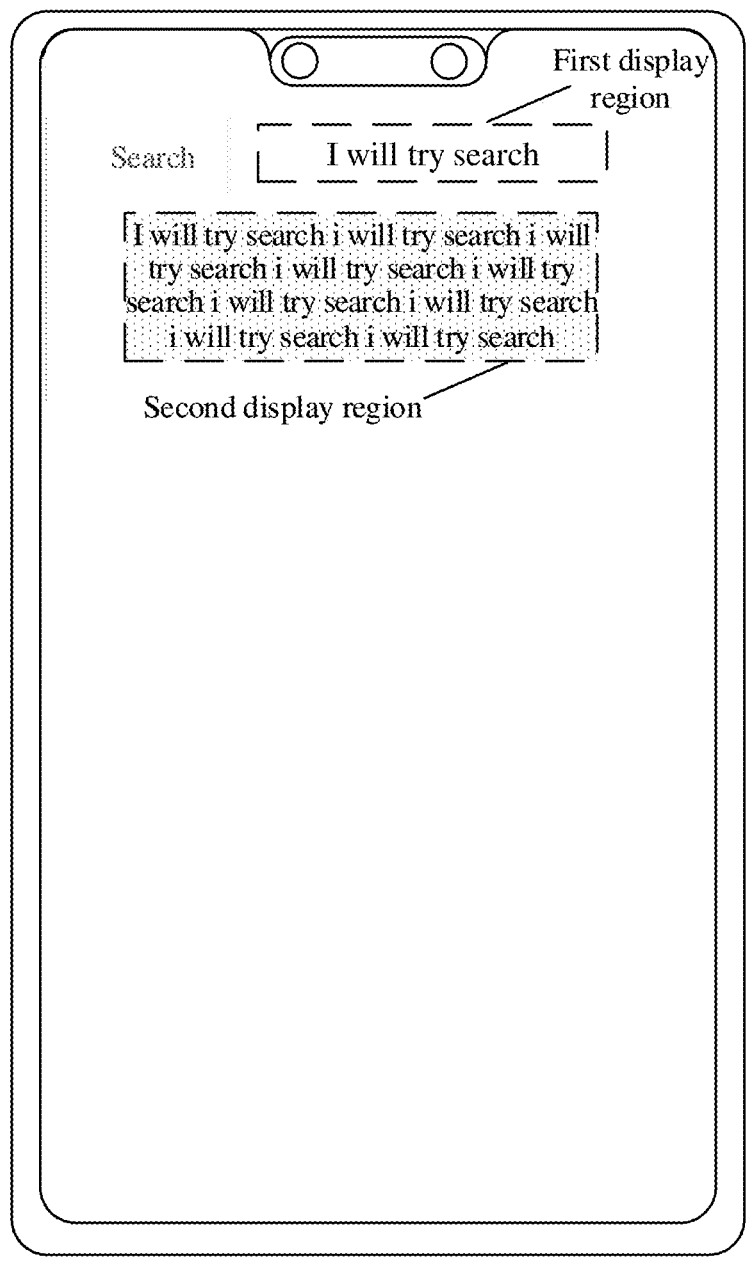
FIG. 3 is an effect drawing of a first display region and a second display region in a method for displaying content according to an embodiment of the disclosure.

For example, as shown in FIG. 3, it is determined that the target content cannot be completely displayed in the first display region when the target content in the first display region in FIG. 3 meets the first condition, and the current font size is the preset minimum font size and cannot be continuously reduced, so the target content "I will try search i will try search i will try search i will try search i will try search i will try search i will try search i will try search" cannot be completely displayed in the first display region, and overflow occurs. The second display region is established, and the target content "I will try search i will try search i will try search i will try search i will try search i will try search i will try search i will try search" is completely displayed in the second display region.

It should be noted that when the target content is displayed in the second display region, the preset minimum font size can be used, or the font size when the target content is displayed can be determined according to the set length and height of the second display region and the number of the objects in the target content, or the target content can be displayed in the second display region in the preset default font size.

The second display region may be other containers such as a textbox, an input box, a floating window, a container with a specific shape or a container with a specific effect, and is used for displaying all the target content, so that the user can view the entered content conveniently. The user does not need to change the position of the display focus when modifying the entered content, thus the user can view all the entered content conveniently. Interactive operation is simplified, and user experience is improved.

Figure 4:
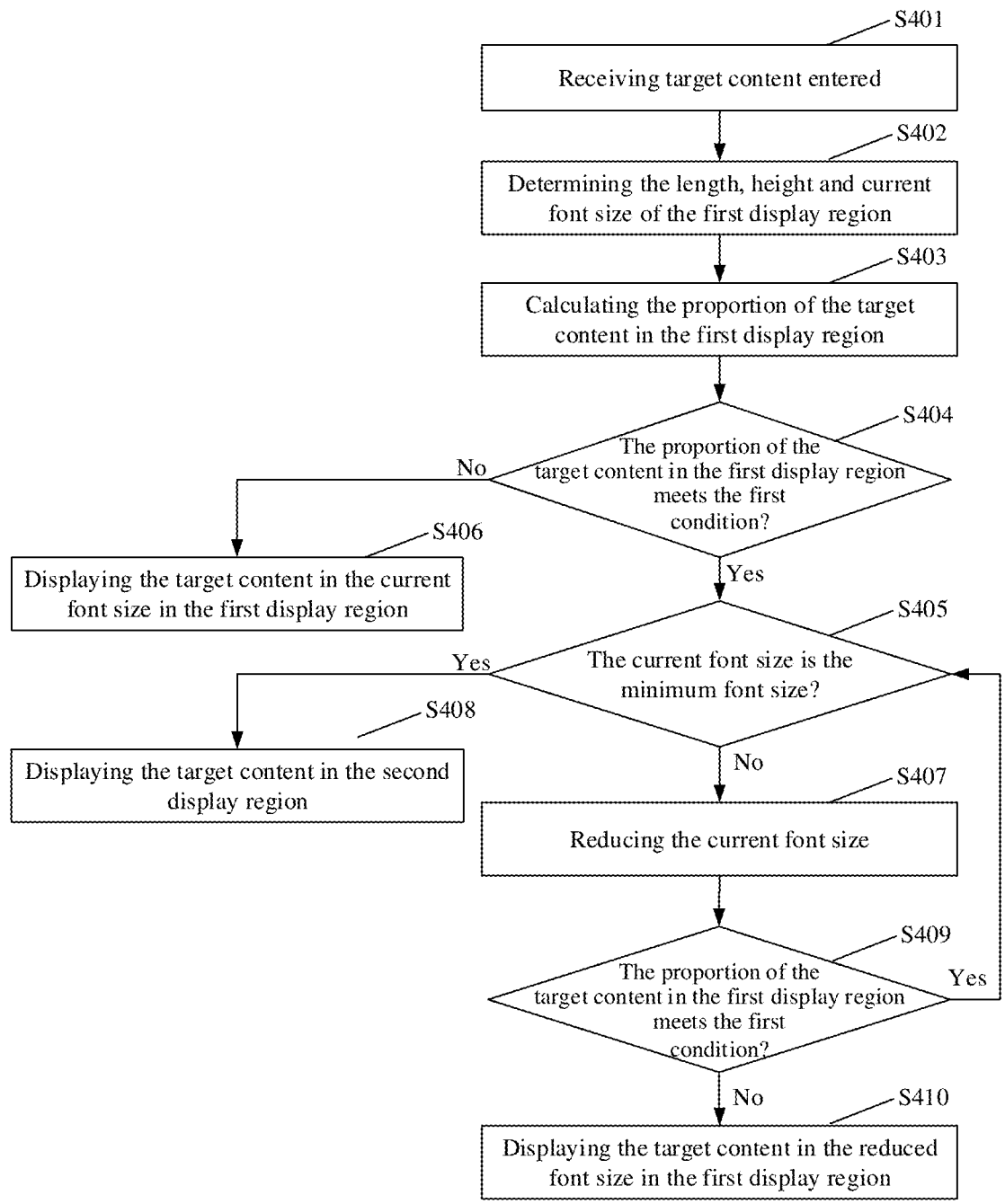
FIG. 4 is a schematic diagram of another method for displaying content according to an embodiment of the disclosure.

FIG. 4 is a schematic diagram of a method for displaying content as shown in an embodiment of the disclosure. As shown in FIG. 4, the method for displaying content includes the following steps.

S401, receiving target content entered.

In some embodiments, when the user clicks the input box or input interface, that is, when the user triggers an input instruction, the target content entered by the user is received. In actual application scenes, the user can trigger the input instruction once or multiple times; when the user triggers the input instruction once, the target content entered by the user once is received; and when the user triggers the input instruction multiple times, all the target content entered by the user for multiple times is received.

S402, determining the length, height and current font size of the current first display region.

In some embodiments, the first display region displays the target content entered by the user, the first display region is configured to be fixed in length and height according to actual application scene requirements, and the font size of the displayed content may be configured to be the default font size. When the target content does not meet the first condition, for example, when the proportion of the target content in the first display region is smaller than the preset threshold, the target content is displayed in the pre-configured default font size.

The font size of the displayed content may be changed within a certain range; the font size is changed between the preset maximum font size and the preset minimum font size; and when the font size of the displayed content is not changed, the font size of the displayed content is determined as the current font size, and the displayed content is displayed in the current font size in the first display region.

When the font size of the displayed content is changed, the displayed content is displayed in the changed font size in the first display region. The length, height and font size of the first display region may be pre-configured by an application program or a controller. The preset maximum font size may be set as the preset default font size. If the maximum font size is not preset, the other font size in the interface where the input box is located may be inherited as the maximum font size. If the minimum font size is not preset, the height of the minimum font size may be two thirds of the height of the first display region; and the maximum font size and the minimum font size of the displayed content may also be pre-configured in a user-defined mode.

It should be noted that the font size of the displayed content may be changed between the maximum font size and the minimum font size. When the font size is changed, the font size may be changed by the preset interval for font size, the preset pixel value or the preset proportion. The change of the font size of the displayed content includes reducing and increasing.

S403, calculating the proportion of the target content in the first display region.

In some embodiments, according to an actual application scene, a mode of calculating the proportion of the target content in the first display region is set. For example, when the first display region is set to display one row of content, the proportion of the target content in the first display region can be obtained by calculating the ratio of the total width of the target content to the width of the first display region, or, the proportion of the target content in the first display region is obtained by calculating the ratio of the number of the characters in the target content to the maximum number of the characters displayed in the default font size in the first display region. When the first display region is set to display multiple rows of content, the proportion of the target content in the first display region can be obtained by calculating the ratio of the overall area of the target content to the area of the first display region.

S404, determining whether the proportion of the target content in the first display region meets the first condition in real time, if yes, executing S405, and if no, executing S406.

Wherein the first condition is that the proportion of the target content in the first display region is greater than a preset threshold. For example, the proportion of the length of the target content to the length of the first display region is greater than the first preset threshold; or, the proportion of the area of the target content to the area of the first display region is greater than the second preset threshold; or, the proportion of the number of the characters of the target content to the preset character number of the first display region is greater than the third preset threshold.

The first to third preset thresholds and the preset character number may be empirical values. When the occupancy rate meets the first condition, it is determined that display overflow occurs in the condition that the target content is continuously displayed in the current font size, that is, the target content cannot be completely displayed in the first display region, and the next step S405 is executed. If the target content does not meet the first condition, it is determined that the target content can be completely displayed in the first display region in the condition that the target content is continuously displayed in the current font size, and S406 is executed in the next step. The first to third preset thresholds may be one same value or different values respectively.

S405, determining whether the current font size is the minimum font size, if yes, executing S408, and otherwise, executing S407.

In some embodiments, the font size may be changed within the range between the maximum font size and the minimum font size. When the current font size is the minimum font size, it is determined that the current font size cannot be continuously reduced, and S408 is executed in the next step; and when the current font size is not the minimum font size, it is determined that the current font size can be continuously reduced, and S407 is executed in the next step.

S406, displaying the target content in the current font size in the first display region.

S407, reducing the current font size.

In some embodiments, the current font size may be reduced by the font size interval which is preset, or the current font size may be reduced by a preset pixel value (such as 2 pixels) or a preset change proportion (such as 0.85), that is, the width of the font size is changed into the width of the product of the width of the current font size and the preset change proportion, and the length of the font size can be correspondingly changed, or a length change proportion reduction value is additionally set.

S408, establishing the second display region, and displaying the target content in the second display region.

In some embodiments, when the occupancy rate meets the first condition, and the current font size is the minimum font size, that is, when the target content cannot be completely displayed in the first display region by reducing the font size of the content displayed in the first display region, the second display region is established, and the target content is displayed in the second display region.

As shown in FIG. 3, when the proportion of the target content in the first display region is greater than the preset ratio threshold, the current font size is the minimum font size, and the target content cannot be completely displayed in the first display region, the second display region is established, and the target content is displayed in the second display region.

It should be noted that the second display region may be other containers such as a textbox, an input box, a floating window, a container with a specific shape or a container with a specific effect (sound effect and rendering effect), and is used for displaying all the target content, so that the user can view the entered content conveniently. The user does not need to change the position of the display focus to view the target content when modifying the entered content, thus interactive operation is simplified, and user experience is improved.

S409, determining whether the proportion of the target content in the first display region meets the first condition meets the first condition, if yes, executing S405, and if no, executing S410.

In some embodiments, after the current font size of the target content is reduced, the current font size is updated to be the reduced font size. Whether the target content displayed in the current font size meets the first condition can be determined again; if yes, it is determined that the target content in the reduced font size cannot be completely displayed in the first display region, the font size needs to be continuously reduced or the target content needs to be displayed in the second display region, and S405 is executed in the next step; and if no, it is determined that the target content in the reduced font size can be completely displayed in the first display region with no need of continuously reducing the font size, and S410 is executed in the next step. Wherein whether the target content in the reduced font size meets the first condition is determined again so as to enable the target content to be completely displayed in the first display region or second display region.

S410, displaying the target content in the reduced font size in the first display region.

Figure 5:
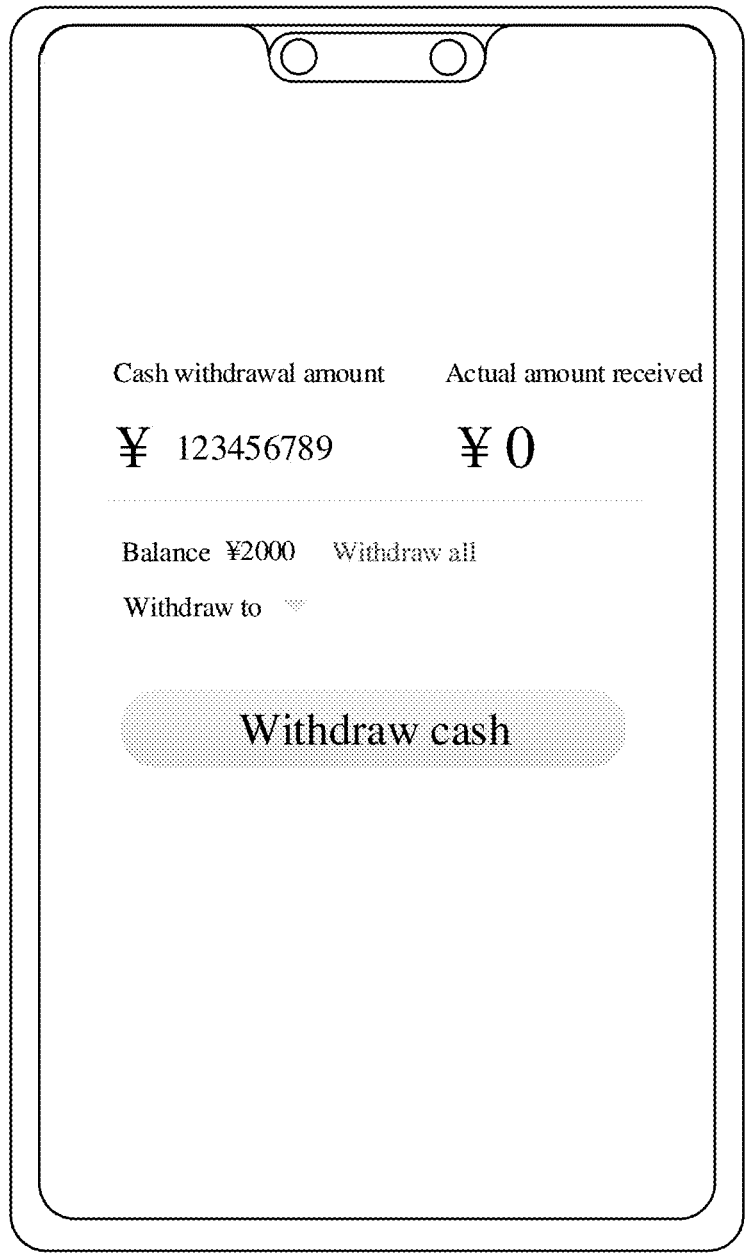
FIG. 5 is an effect drawing of a method for displaying content according to an embodiment of the disclosure.

In some embodiments, the target content is displayed in the first display region, and as shown in FIG. 5, the target content can be directly and completely displayed in the first display region by reducing the font size, so that the user can view the target content conveniently, and does not need to move the display focus to view the target content, and thus user operation is simplified, and user experience is improved.

In an actual application scene, after the user enters the content, the displayed content may be modified, such as adding the entered content or cutting the entered content, so that the target content modified by the user needs to be determined in real time. The target content after adding or cutting by the user needs to be displayed. After whether the occupancy rate meets the condition is determined, whether the font size of the displayed content needs to be changed is determined, and the method for displaying content shown in the embodiment can be implemented when the entered content is added.

Figure 6:
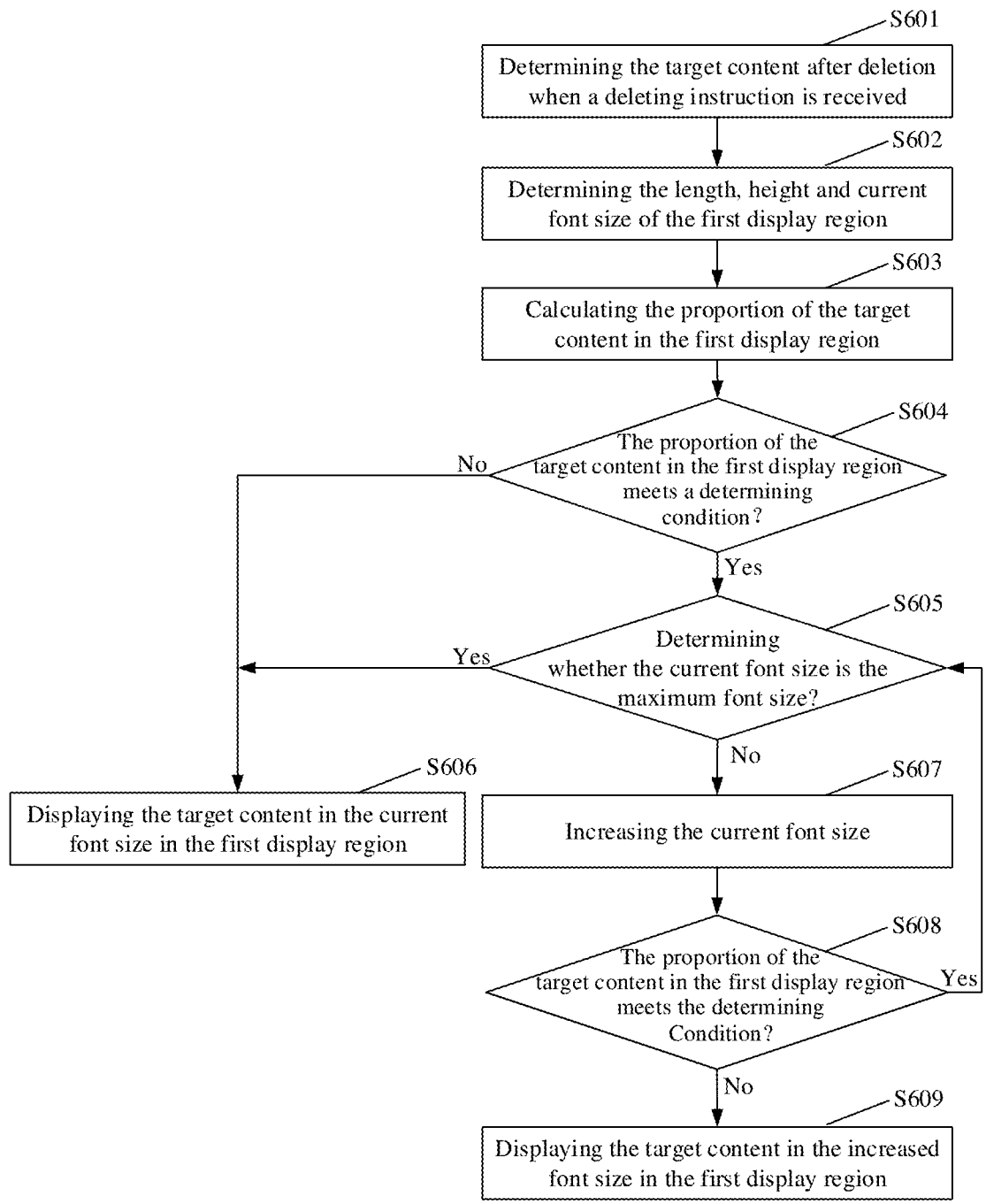
FIG. 6 is a schematic diagram of yet another method for displaying content according to an embodiment of the disclosure.

FIG. 6 is a schematic diagram of a method for displaying content as shown in an embodiment of the disclosure when the user cuts the entered content. As shown in FIG. 6, the method for displaying content includes the following steps.

S601, determining the target content after deletion when a deleting instruction is received.

In some embodiments, when the user clicks a delete key during an entering process, that is, when the user triggers the deleting instruction, the target content after the user performs deletion is determined. In actual application scenes, the user can trigger the deleting instruction once or multiple times; when the user triggers the deleting instruction once, the target content after the user deletes the content of all the original displayed content once is determined; and when the user triggers the deleting instruction multiple times, the target content after the user deletes the content of all the original displayed content for multiple times is determined.

It should be noted that the target content is the entered content after actual adding or cutting by the user, namely the displayed content.

S602, determining the length, height and current font size of the current first display region.

S603, calculating the proportion of the target content in the first display region.

In some embodiments, according to the actual application scene, a mode of calculating the proportion of the target content in the first display region is set. For example, when the first display region is set to display one row of content, the proportion of the target content in the first display region can be obtained by calculating the ratio of the total width of the target content to the width of the first display region, or, the proportion of the target content in the first display region is obtained by calculating the ratio of the number of the characters in the target content to the maximum number of the characters displayed in the first display region in the default font size. When the first display region is set to display multiple rows of content, the proportion of the target content in the first display region can be obtained by calculating the ratio of the overall area of the target content to the area of the first display region.

S604, determining whether the proportion of the target content in the first display region meets a determining condition, if yes, executing S605, and if no, executing S606.

In some embodiments, the determining condition may include more than one of the following conditions. Wherein the determining condition is that the proportion of the target content in the first display region is greater than a preset threshold.

For example, the proportion of the length of the target content to the length of the first display region is not greater than the fourth preset threshold; or the proportion of the area of the target content to the area of the first display region is not greater than the fifth preset threshold; or, the proportion of the number of the characters of the target content to the preset character number of the first display region is not greater than the sixth preset threshold. The fourth preset threshold, the fifth preset threshold, the sixth preset threshold and the preset character number may be empirical values. In some embodiments, the fourth preset proportion threshold is smaller than the first preset proportion threshold; and the fifth preset proportion threshold is smaller than the second preset proportion threshold. In some embodiments, the fourth to sixth preset thresholds may be one same value or different values respectively.

When the occupancy rate meets the determining condition, it is determined that if the target content is continuously displayed in the current font size, the target content can be completely displayed in the first display region, and when the target content is displayed in the first display region, the proportion of the target content in the first display region is smaller than that of a blank part (a part of the content that is not displayed) of the content to be displayed in the first display region, so that it is inconvenient for the user to view the target content, and S605 is executed in the next step; if the target content does not meet the first condition, it is determined that if the target content is continuously displayed in the current font size, the target content can be completely displayed in the first display region, and when the target content is displayed in the first display region, compared with the blank part of the content to be displayed, the proportion of the target content in the first display region is appropriate, so that it is convenient for the user to view the target content, and S606 is executed in the next step.

S605, determining whether the current font size is the maximum font size, if yes, executing S606, and otherwise, executing S607.

In some embodiments, the font size may be changed within the range between the maximum font size and the minimum font size. When the current font size is the maximum font size, it is determined that the current font size cannot be increased, and S606 is executed in the next step; and when the current font size is not the maximum font size, it is determined that the current font size can be increased, and S607 is executed in the next step.

S606, displaying the target content in the current font size in the first display region.

S607, increasing the current font size.

In some embodiments, the current font size may be increased by the font size interval which is preset, or the current font size may be increased by a preset pixel value (such as 2 pixels) or a preset change proportion (such as 1.25), that is, the width of the font size is changed into the width of the product of the width of the current font size and the preset change proportion, and the length of the font size may be correspondingly changed, or a length change proportion increase value is additionally set.

S608, determining whether the proportion of the target content in the first display region meets the first condition, if yes, executing S605, and if no, executing S609.

In some embodiments, after the current font size of the target content is increased, the current font size is updated to be the increased font size. Whether the target content in the current font size meets the first condition may be determined again.

If yes, it is determined that the target content in the increased font size can be completely displayed in the first display region, and when the target content is displayed in the first display region, the proportion of the target content in the first display region is smaller than that of the blank part of the content to be displayed in the first display region, so that it is inconvenient for the user to view the target content, the font size needs to be continuously increased, and S605 is executed in the next step.

If no, it is determined that the target content in the increased font size can be completely displayed in the first display region, and when the target content is displayed in the first display region, compared with the blank part of the content to be displayed, the proportion of the target content in the first display region is appropriate, so that the font size does not need to be continuously increased, and S609 is executed in the next step.

Whether the target content in the increased font size meets the first condition is determined again so as to enable the target content to be completely displayed in first display region; and when the target content is displayed in the first display region, compared with the blank part of the content to be displayed, the proportion of the target content in the first display region is appropriate, so that it is convenient for the user to view the target content.

S609, displaying the target content in the increased font size in the first display region.

It should be noted that after the target content is displayed in the second display region, and the user cuts the target content, the occupancy rate meets the determining condition, that is, the target content can be completely displayed in the first display region. And when the target content is displayed in the first display region, the proportion of the target content in the first display region is smaller than that of the blank part of the content to be displayed in the first display region, so that it is inconvenient for the user to view the target content, and the content displayed in the second display region can be emptied, or the second display region is not displayed while the content displayed in the second display region is emptied, for example, the container of the second display region disappears.

Based on the same concept of the embodiments of the present disclosure mentioned above, FIG. 7 is a block diagram of a terminal for displaying content 800 as shown in an embodiment of the disclosure.

Figure 7:
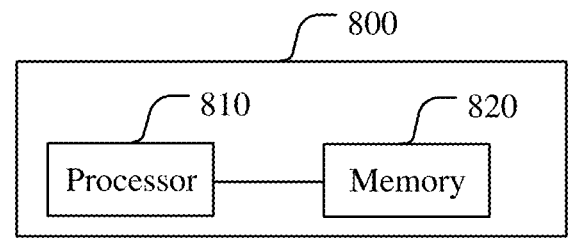
FIG. 7 is a block diagram of an example of a terminal for displaying content according to an embodiment of the disclosure.

As shown in FIG. 7, the terminal for displaying content 800 shown in an embodiment of the present disclosure includes:

a processor 810; and a memory 820 configured to store one or more instructions executed by the processor 810;

wherein the processor 810 is configured to execute the instructions to perform the method for displaying content disclosed in the embodiment of the present disclosure.

In an embodiment of the disclosure, also provided is a storage medium including one or more instructions, such as a memory 820 including the instructions, wherein the instructions can be executed by the processor 980 of the device for displaying content to perform the above-mentioned method. Optionally, the storage medium may be a non-transitory computer-readable storage medium, e.g., the non-transitory computer-readable storage medium may be a read-only memory, ROM, a random access memory (RAM), a compactdisc read-only memory (CD-ROM), a magnetic tape, a floppy disk, optical data storage equipment and the like.

Figure 8:
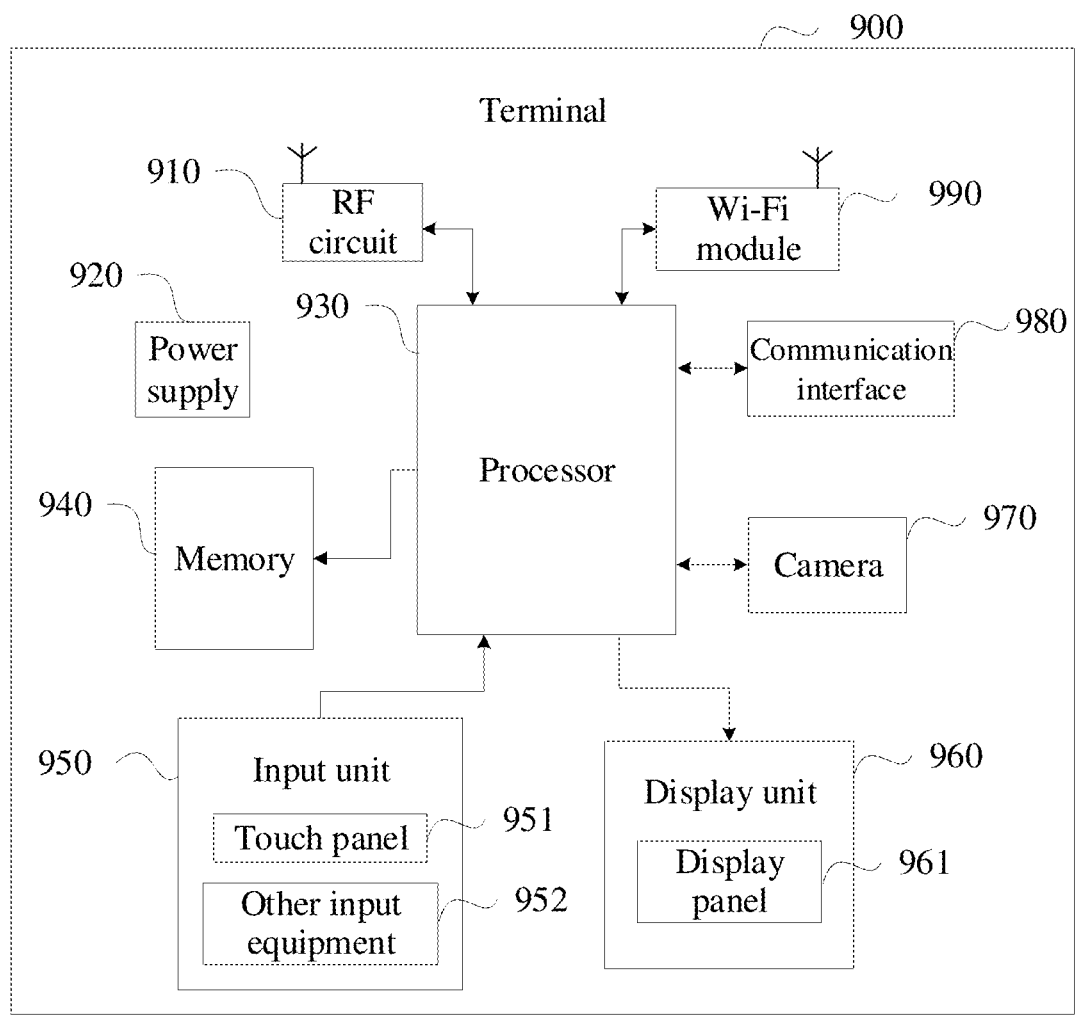
FIG. 8 is a block diagram of a structure of a terminal for displaying content according to an embodiment of the disclosure.

In an embodiment of the present disclosure, as shown in FIG. 8, the embodiment of the present disclosure provides a terminal for displaying content 900 including components such as a radio frequency (RF) circuit 910, a power supply 920, a processor 930, a memory 940, an input unit 950, a display unit 960, a camera 970, a communication interface 980 and a wireless fidelity (WIFI) module 990. It should be understood by those skilled in the art that the structure of the terminal shown in FIG. 8 does not constitute a limitation on the terminal, and that the terminal provided by embodiments of the present application may include more or fewer illustrated components, or combination of the certain components, or different arrangements of the components.

Each component of the terminal 900 is described in detail below in combination with FIG. 8.

The RF circuit 910 can be used for receiving and sending data during a communication or call process. Specifically, after receiving downlink data of a base station, the RF circuit 910 sends the data to the processor 930 for processing, and further sends uplink data to be sent to the base station. Generally, the RF circuit 910 includes, but is not limited to, an antenna, at least one amplifier, a transceiver, a coupler, a low noise amplifier (LNA), a duplexer, etc.

In addition, the RF circuit 910 can also communicate with other terminals through wireless communications and networks. The wireless communications can use any communication standard or protocol including, but not limited to, global system of mobile communication (GSM), general packet radio service (GPRS), code division multiple access (CDMA), wideband code division multiple access (WCDMA), long term evolution (LTE), email, short messaging service or the like.

The Wi-Fi technology belongs to a short-range wireless transmission technology, and the terminal 900 can be connected to an access point (AP) through the Wi-Fi module 990, so that the access to a data network is realized. The Wi-Fi module 990 can be used for receiving and sending data during a communication process.

The terminal 900 may be physically connected to other terminals through the communication interface 980. Optionally, the communication interface 980 is connected to the communication interfaces of the other terminals through cables to achieve data transmission between the terminal 900 and the other terminals.

In the embodiment of the present application, the terminal 900 can realize communication service and send information to other contacts, so that the terminal 900 needs to have a data transmission function, i.e., the terminal 900 needs to include a communication module. Although FIG. 8 shows communication modules such as the RF circuit 910, the Wi-Fi module 990 and the communication interface 980, it should be understood that the terminal 900 includes at least one of the above components or other communication modules (e.g., Bluetooth modules) used for implementing communication, to perform data transmission.

For example, when the terminal 900 is a mobile phone, the terminal 900 may include the RF circuit 910 and may also include the Wi-Fi module 990; when the terminal 900 is a computer, the terminal 900 may include the communication interface 980 and may also include the Wi-Fi module 990; and when the terminal 900 is a tablet computer, the terminal 900 may include the Wi-Fi module.

The memory 940 may be configured to store software programs and modules. The processor 930 executes various functional applications and data processing of the terminal 900 by running the software programs and modules stored in the memory 940, and after the processor 930 executes program codes in the memory 940, some or all of the processes in FIGS. 2, 4 and 6 of the present disclosure embodiment can be achieved.

In some embodiments, the memory 940 may mainly include a program storage region and a data storage region, wherein the program storage region can store an operating system, various application programs (such as communication applications), a face recognition module and the like; and the data storage region can store data (such as multimedia files of various pictures and video files, and face information templates) and the like created according to the use of the terminal.

In addition, the memory 940 may include a high-speed random access memory, and may also include a non-volatile memory, such as at least one magnetic disk storage device, flash memory device, or other volatile solid-state storage device.

The input unit 950 can be used for receiving numerical or character information entered by the user and generating a key signal input related to user settings and functional control of the terminal 900.

Optionally, the input unit 950 may include a touch panel 951 and other input terminals 952, wherein the touch panel 951, also called a touch screen, can collect touch operation of the user on or near the touch panel 951 (such as user operation on or near the touch panel 951 by using any suitable object or accessory such as a finger and a touch pen), and drive a corresponding connection device according to a preset program. Optionally, the touch panel 951 may include two parts: a touch detection device and a touch controller, wherein the touch detection device is used for detecting a touch orientation of the user, detecting a signal brought by the touch operation and transmitting the signal to the touch controller; and the touch controller receives touch information from the touch detection device, converts the touch information into touch point coordinates, sends the touch point coordinates to the processor 930, and can receive and execute commands sent by the processor 930. In addition, the touch panel 951 can be implemented in a variety of types, such as a resistive type, a capacitive type, an infrared type and a surface acoustic wave type.

Optionally, the other input terminals 952 may include, but is not limited to, one or more of a physical keyboard, a function key (such as a volume control key and a switch key), a trackball, a mouse, a function lever, etc.

The display unit 960 can be used for displaying information entered by the user or information provided to the user, and various menus of the terminal 900. The display unit 960 is a display system of the terminal 900 and is used for presenting an interface and realizing human-computer interaction.

The display unit 960 may include a display panel 961. Optionally, the display panel 961 may be configured in the form of a liquid crystal display (LCD), an organic light-emitting diode (OLED), or the like.

Furthermore, the touch panel 951 can cover the display panel 961, and when detecting touch operation on or near the touch panel 951, the touch panel 951 transmits the touch operation to the processor 930 to determine the type of a touch event, and then the processor 930 provides a corresponding visual output on the display panel 961 according to the type of the touch event.

Although in FIG. 8, the touch panel 951 and the display panel 961 are used as two independent components to implement input and output functions of the terminal 900, in some embodiments, the touch panel 951 and the display panel 961 may be integrated to implement the input and output functions of the terminal 900.

The processor 930 is a control center of the terminal 900, connects the various components by using various interfaces and circuits, executes the various functions and processes data of the terminal 900 by running or executing the software programs and/or modules stored in the memory 940, and calling the data stored in the memory 940, and thus achieves multiple kinds of service based on the terminal.

Optionally, the processor 930 may include one or more processing units. Optionally, the processor 930 may be integrated with an application processor and a modem, wherein the application processor is mainly used for processing the operating system, an user interface, an application program, etc., and the modem is mainly used for processing wireless communication. It should be understood that the above-mentioned modem may also not be integrated into the processor 930.

The camera 970 is used for achieving a shooting function of the terminal 900, for shooting pictures or videos. The camera 970 may also be used for achieving a scanning function of the terminal 900, for scanning a scan object (a QR code/bar code).

The terminal 900 also includes a power supply 920 (such as a battery) for powering the various components. Optionally, the power supply 920 can be logically connected to the processor 930 through a power supply management system, so that the functions of managing charging, discharging, power consumption and the like can be achieved through the power supply management system.

It should be noted that, in the embodiment of the present disclosure, the processor 930 can execute the functions of the processor 810 in FIG. 8, and the memory 940 stores the content of the processor 810.

Besides, in an embodiment of the disclosure, the present disclosure further provides a storage medium, and when one or more instructions in the storage medium is executed by the processor of the terminal for displaying content, the terminal for displaying content can implement the method for displaying content in the embodiment of the present disclosure.

Other embodiments of the present disclosure will easily occur to those skilled in the art upon consideration of the specification and practice of the present disclosure disclosed herein. The present disclosure aims at covering any variation, application, or adaptive change of the present disclosure that follow the generic principles of the present disclosure and including common general knowledge or customary technical means that the present disclosure does not disclose in the technical field. The specification and examples are to be regarded as being exemplary only with the true scope and spirit of the present disclosure being indicated by the following claims.

It should be understood that the present disclosure is not limited to the precise structures that have been described above and illustrated in the accompanying drawings, and that various modifications and changes can be made without departing from the scope of the present disclosure. The scope of the present disclosure is limited only by the appended claims.

What is claimed is:

1. A method for displaying content, comprising:
   receiving target content entered in a first display region;
   calculating an occupancy rate of the target content in the first display region in real time;
   reducing a font size of the target content in response to the occupancy rate being greater than a preset threshold; and
   displaying the target content with the reduced font size in the first display region in response to: an occupancy rate of the target content with the reduced font size in the first display region being not greater than the preset threshold, and the reduced font size being greater than or equal to a minimum font size; or
   generating a second display region for displaying the target content in response to: an occupancy rate of the target content with the reduced font size in the first display region being greater than the preset threshold, and the reduced font size being equal to the minimum font size, wherein an area of the second display region is greater than an area of the first display region, and displaying the target content with the minimum font size in the second display region, wherein an occupancy rate of the target content with the minimum font size in the second display region is not greater than the preset threshold.

2. The method according to claim 1, wherein said calculating the occupancy rate of the target content in the first display region in real time comprises:
   calculating the occupancy rate in real time based on at least one of:
   a length of the target content and a length of the first display region;
   an area of the target content and an area of the first display region; and/or
   a character number of the target content and a preset character number of the first display region.

3. The method according to claim 1, wherein said reducing the font size comprises:
   determining a reduced font size; and
   reducing the font size to the reduced font size in a fixed interval.

4. A terminal for displaying content, comprising:
   a processor; and
   a memory configured to store one or more instructions executed by the processor;
   wherein the processor is configured to execute the instructions to:
   receive target content entered in a first display region;
   calculate an occupancy rate of the target content in the first display region in real time;
   reduce a font size of the target content in response to the occupancy rate being greater than a preset threshold; and
   display the target content with the reduced font size in the first display region in response to: an occupancy rate of the target content with the reduced font size in the first display region being not greater than the preset threshold, and the reduced font size being greater than or equal to a minimum font size; or
   generate a second display region for displaying the target content in response to: an occupancy rate of the target content with the reduced font size in the first display region being greater than the preset threshold, and the reduced font size being equal to the minimum font size, wherein an area of the second display region is greater than an area of the first display region, and display the target content with the minimum font size in the second display region, wherein an occupancy rate of the target content with the minimum font size in the second display region is not greater than the preset threshold.

5. The terminal according to claim 4, wherein the processor further is configured to:
   calculate the occupancy rate in real time based on at least one of:
   a length of the target content and a length of the first display region;
   an area of the target content and an area of the first display region; and/or
   a character number of the target content and a preset character number of the first display region.

6. The terminal according to claim 4, wherein the processor further is configured to:
   determine a reduced font size; and
   reduce the font size to the reduced font size in a fixed interval.

7. A non-transitory computer-readable storage medium, configured to store one or more instructions which are executed by a processor of a terminal for displaying content to:

receive target content entered in a first display region;

calculate an occupancy rate of the target content in the first display region in real time;

reduce a font size of the target content in response to the occupancy rate being greater than a preset threshold; and display the target content with the reduced font size in the first display region in response to: an occupancy rate of the target content with the reduced font size in the first display region being not greater than the preset threshold, and the reduced font size being greater than or equal to a minimum font size; or generate a second display region for displaying the target content in response to: an occupancy rate of the target content with the reduced font size in the first display region being greater than the preset threshold, and the reduced font size being equal to the minimum font size, wherein an area of the second display region is greater than an area of the first display region, and display the target content with the minimum font size in the second display region, wherein an occupancy rate of the target content with the minimum font size in the second display region is not greater than the preset threshold.

8. The storage medium according to claim 7, wherein the storage medium is further configured to store one or more instructions which are executed by a processor of a terminal for displaying content to:

calculate the occupancy rate in real time based on at least one of:

a length of the target content and a length of the first display region;

an area of the target content and an area of the first display region; and/or a character number of the target content and a preset character number of the first display region.

* * * * *